US012209673B2

(12) United States Patent
Wei et al.

(10) Patent No.: US 12,209,673 B2
(45) Date of Patent: Jan. 28, 2025

(54) CHECK VALVE FOR LOW PRESSURE OPERATING CONDITIONS

(71) Applicant: BEIJING AEROSPACE PETROCHEMICAL TECHNOLOGY AND EQUIPMENT ENGINEERING CORPORATION LIMITED, Beijing (CN)

(72) Inventors: Xiaoxia Wei, Beijing (CN); Xianyu Bao, Beijing (CN); Na Li, Beijing (CN); Yixiao Wang, Beijing (CN); Shangang Guo, Beijing (CN); Ling Bian, Beijing (CN); Honghui Yu, Beijing (CN); Peng Shuai, Beijing (CN); Xiaofeng Li, Beijing (CN); Xuebin Wang, Beijing (CN); Dianjing Chen, Beijing (CN); Xuli Tang, Beijing (CN)

(73) Assignee: BEIJING AEROSPACE PETROCHEMICAL TECHNOLOGY AND EQUIPMENT ENGINEERING CORPORATION LIMITED, Beijing (CN)

( * ) Notice: Subject to any disclaimer, the term of this patent is extended or adjusted under 35 U.S.C. 154(b) by 20 days.

(21) Appl. No.: 18/028,077

(22) PCT Filed: Sep. 10, 2021

(86) PCT No.: PCT/CN2021/117737
§ 371 (c)(1),
(2) Date: Mar. 23, 2023

(87) PCT Pub. No.: WO2022/078135
PCT Pub. Date: Apr. 21, 2022

(65) Prior Publication Data
US 2024/0026985 A1      Jan. 25, 2024

(30) Foreign Application Priority Data

Oct. 15, 2020   (CN) .......................... 202011104363.1

(51) Int. Cl.
*F16K 7/12*         (2006.01)
*F16K 1/54*         (2006.01)
(Continued)

(52) U.S. Cl.
CPC ................ *F16K 15/14* (2013.01); *F16K 1/54* (2013.01); *F16K 7/126* (2013.01); *F16K 7/17* (2013.01); *F16K 15/144* (2013.01)

(58) Field of Classification Search
CPC .......... F16K 1/54; F16K 15/14; F16K 15/144; F16K 7/126; F16K 7/17; F16K 7/123; F16K 7/12
See application file for complete search history.

(56) References Cited

U.S. PATENT DOCUMENTS 3,390,696 A * 7/1968 Dawson .................. F16K 15/14
                                                      137/496
3,534,768 A * 10/1970 Powell .................. F16K 15/144
                                                     137/496

(Continued)

FOREIGN PATENT DOCUMENTS

CN      102449363 A      5/2012
CN      103140166 A      6/2013
(Continued)

OTHER PUBLICATIONS

PCT International Search Report (w/ English translation) and Written Opinion for corresponding Application No. PCT/CN2021/117737, mailed Nov. 12, 2021, 12 pages.

(Continued)

*Primary Examiner* — Kelsey E Cary
(74) *Attorney, Agent, or Firm* — Dority & Manning, P.A.

(57) ABSTRACT

A check valve for low pressure operating conditions includes: a valve cover, a valve body, and an upper dia- (Continued)

phragm between the body and the cover. A first pressure cavity is provided on a lower surface of the valve cover and used for accommodating a backward direction medium, a second pressure cavity is machined on an upper surface of the valve body, within which an inflow passage and an outflow passage are provided, an inflow hole is machined from an inner wall of the inflow passage to a bottom face of the second pressure cavity, and a medium enters into the second pressure cavity from the inflow passage via the inflow hole, and applies upward pressure on the upper diaphragm. A backflow channel in communication with the first pressure cavity is machined on a side wall of the outflow passage.

10 Claims, 2 Drawing Sheets

(51) Int. Cl.
    *F16K 7/17*        (2006.01)
    *F16K 15/14*       (2006.01)

(56) References Cited

U.S. PATENT DOCUMENTS

| | | | |
|---|---|---|---|
| 3,823,733 A * | 7/1974 | DuBois | F16K 7/12 |
| | | | 137/496 |
| 5,386,848 A | 2/1995 | Gilchrist et al. | |
| 6,546,954 B2 * | 4/2003 | Sato | F02M 25/0836 |
| | | | 137/550 |
| 7,422,030 B2 | 9/2008 | Stone | |
| 9,604,837 B2 * | 3/2017 | Brown | B67D 7/0478 |
| 2012/0244454 A1 | 9/2012 | Maeda et al. | |
| 2013/0178752 A1 | 7/2013 | Kodama et al. | |
| 2019/0178394 A1 * | 6/2019 | Horiguchi | F16K 7/12 |

FOREIGN PATENT DOCUMENTS

| | | |
|---|---|---|
| CN | 103896368 | 7/2014 |
| CN | 204403466 | 6/2015 |
| CN | 207513975 | 6/2018 |
| CN | 109707878 A | 5/2019 |
| CN | 111536256 | 8/2020 |
| CN | 112377648 | 2/2021 |
| RU | 115430 U | 4/2012 |
| SU | 715874 A | 2/1980 |
| WO | WO2008/089910 | 7/2008 |
| WO | WO2018/033453 | 2/2018 |

OTHER PUBLICATIONS

Substantive Examination (w/ English translation) received in corresponding Russian Application Request No. 2023109328/12(019980) issued on Jul. 19, 2023, 18 pages.

Karyakin et al., "Industrial gas equipment" (w/ English translation), 6th edition, Saratov: Gazovik, 2013, Fig. 6.13, p. 736, 5 pages.

Chinese Office Action (w/ English translation) for corresponding CN Application No. 202011104363.1, issued Mar. 16, 2022, 14 pages.

* cited by examiner

CHECK VALVE FOR LOW PRESSURE OPERATING CONDITIONS

This application claims the benefit of priority to Chinese Patent Application No, 202011104363.1, titled "CHECK VALVE FOR LOW PRESSURE OPERATING CONDITIONS", filed with the China National Intellectual Property Administration on Oct. 15, 2020, which is incorporated herein by reference in its entirety.

FIELD

The present application relates to the technical field of unidirectional sealing, and in particular to a check valve for low pressure operating conditions.

BACKGROUND

In industrial production, a check valve is widely used, which is mainly used to allow a medium to flow in only one direction and not to flow in a reverse direction. In the field of safety valves, since back pressure generally exists at an outlet of the safety valve, several check valves may be reasonably connected and used as a backflow protector, so as to avoid the impact of back pressure on the opening of the safety valve.

In the conventional technology, the check valve is composed of a valve body, a valve cover, a valve seat, a valve disc assembly, a spring and a spring gasket, where the valve seat, the valve disc assembly and the spring are mounted in a chamber defined by the valve body and the valve cover; the valve seat is mounted between the valve body and the valve cover and is sealed by the spring gasket; the valve disc assembly is mounted the chamber of the valve body, and includes a valve disc and a sealing gasket, where the sealing gasket internally lines one end of the valve disc and is sealed to the valve seat; and the spring is mounted at another end of the valve disc. In a case that the pressure is applied in a reverse direction, that is, in a case that the pressure is applied from one end where the spring is located, the medium cannot flow through the valve because the valve disc assembly is sealed to the valve seat; and in a case that the pressure is applied in the nominal direction, the pressure of the medium pushes off the valve disc assembly and the spring, so that the valve is opened, and the medium flows therethrough.

In a case that the inlet pressure of the check valve is excessively low, the spring is hard to be compressed and the valve is hard to open. In a case that the outlet pressure is low, the sealing between the valve disc assembly and the sealing gasket will be loosened and leakage will occur.

Therefore, under low pressure operating conditions, how to enable the check valve to quickly open when the medium flows through the check valve and ensure good sealing of the check valve when the medium flows in the reverse direction is a technical problem that needs to be solved urgently.

SUMMARY

In order to overcome the disadvantages in the conventional technology, the inventors have made keen research to provide a check valve for low pressure operation conditions, which departs from the conventional design concept of the check valve. According to the present application, a valve body, a valve cover, an upper diaphragm, a preferred lower diaphragm, and an elastic cylindrical pin are optimally combined, so that the check valve is quickly opened when the medium flows through the check valve, and excellent sealing can be realized, by using a pressure difference caused by different contact areas of upper and lower surfaces of the upper diaphragm, when a low pressure medium flows reversely. Further, the higher the pressure, the better the sealing effect.

The technical solution according to the present application is as follows:

a check valve for low pressure operating conditions includes a valve cover, a valve body and an upper diaphragm, The upper diaphragm is laid between the valve cover and the valve body. The valve cover, the valve body and the upper diaphragm are tightly connected through threaded fasteners. A first pressure chamber is defined on a lower surface of the valve cover to accommodate a reverse-flow medium.

An inflow passage and an outflow passage are defined inside the valve body, a second pressure chamber is defined on an upper surface of the valve body, an inflow hole is defined to extend from an inner wall of the inflow passage to the bottom of the second pressure chamber, and the medium enters the second pressure chamber from the inflow passage and through the inflow hole, applying an upward pressure on the upper diaphragm, so that the upper diaphragm is moved toward the valve cover.

The outflow passage includes a vertical outflow passage and a horizontal outflow passage, where an inlet end of the vertical outflow passage is located on the upper surface of the valve body, an outlet end of the vertical outflow passage is in communication with the horizontal outflow passage, the second pressure chamber and the inlet end of the vertical outflow passage fall within a cover range of the first pressure chamber, and when the upper diaphragm moves toward the valve cover, the inflow hole is in communication with the vertical outflow passage, and the medium flows through the vertical outflow passage and the horizontal outflow passage and then out of the check valve.

A reverse-flow groove communicated to the first pressure chamber is defined on a side wall of the horizontal outflow passage. A part of the reverse-flow medium entering the horizontal outflow passage enters the first pressure chamber through the reverse-flow groove, and another part of the reverse-flow medium enters the vertical outflow passage. A contact area between the medium and an upper surface of the upper diaphragm is larger than a contact area between the medium and a lower surface of the upper diaphragm, so that a reverse sealing is realized by a pressure difference between the upper surface and the lower surface of the upper diaphragm.

The check valve for low pressure operating conditions according to the present application has at the following beneficial effects.

(1) The check valve for low pressure operation conditions according to the present application is not limited to the conventional design concept of the check valve. According to the present application, a valve body, a valve cover, an upper diaphragm, a preferred lower diaphragm, and an elastic cylindrical pin are optimally combined, and excellent sealing of the check valve can be realized, by using a pressure difference caused by different contact areas of upper and lower surfaces of the upper diaphragm, when a low pressure medium flows reversely. Further, the higher the pressure, the better the sealing effect.

(2) In the check valve for low pressure operating conditions according to the present application, the upper diaphragm which is elastically deformable is fixed between the valve body and the valve cover, so that the check valve can be quickly opened under a relatively low pressure.

(3) In the check valve for low pressure operating conditions according to the present application, the inflow hole is designed to have an inclination, so that the medium can smoothly enter the inflow hole after entering the inflow passage, which reduces the fluid fluctuation and sharp pressure increase caused by the shrinkage of the medium hole passage in the inflow passage.

(4) In the check valve for low pressure operating conditions according to the present application, the height of the first pressure chamber is specially designed to control the deformation of the upper diaphragm to be within an appropriate range, which is conducive to high-frequency use of the upper diaphragm.

(5) In the check valve for low pressure operating conditions according to the present application, the lower diaphragm is arranged in the second pressure chamber, and the height of the lower diaphragm is specially designed, so that the lower diaphragm can support the upper diaphragm during sealing, which can depress the deformation of the upper diaphragm. Therefore, the sealing can still be realized even with a smaller deformation caused by a smaller pressure difference between the upper and lower surfaces of the upper diaphragm.

(6) In the check valve for low pressure operating conditions according to the present application, the elastic cylindrical pin is mounted in the reverse-flow groove, and the upper end of the elastic cylindrical pin is located in the first pressure chamber, which helps the reverse-flow medium flow into the first pressure chamber to realize sealing.

(7) In the check valve for low pressure operating conditions according to the present application, the vertical outflow, passage in the valve body is located at the axis of the valve body, and the annular second pressure chamber is located on the outer circumference of the vertical outflow passage, so that the upper diaphragm is relatively uniformly stressed, which is beneficial to prolonging the service life.

Figure 1:
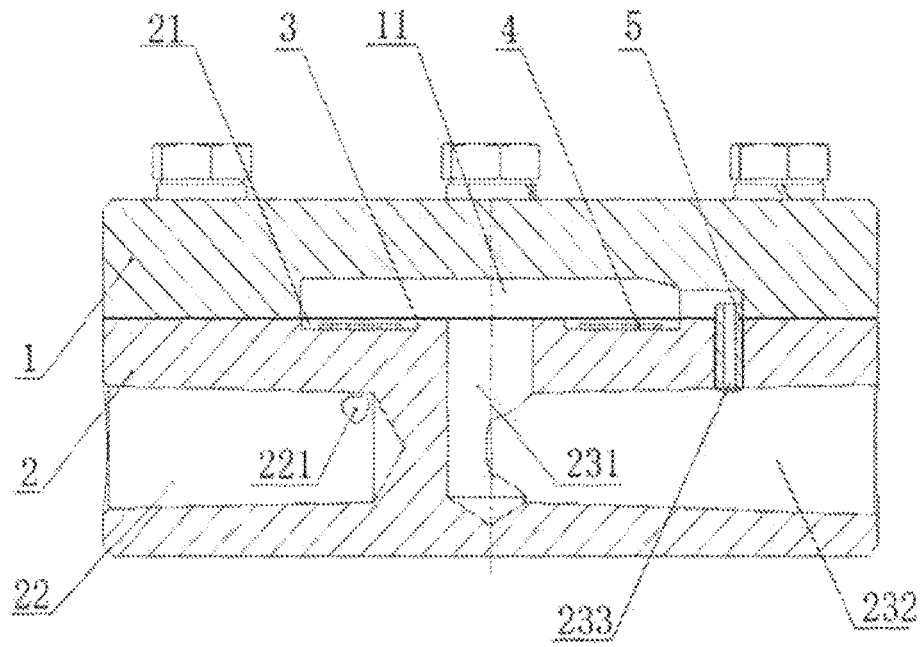
FIG. 1 is a schematic cross-sectional view of a check valve for low pressure operating conditions according to a preferred embodiment of the present application.

REFERENCE NUMERALS ARE AS FOLLOWS 1 valve cover, 11 first pressure chamber,

| | |
|---|---|
| 1 valve cover, | 11 first pressure chamber, |
| 2 valve body, | 21 second pressure chamber, |
| 22 inflow passage, | 221 inflow hole, |
| 231 vertical outflow passage, | 232 horizontal outflow passage, |
| 233 reverse-flow groove, | 3 upper diaphragm, |
| 4 lower diaphragm, | 5 elastic cylindrical pin. |

DETAILED DESCRIPTION OF THE EMBODIMENTS

The features and advantages of the present application will become clearer and more definite from the following detailed description of the present application.

A check valve for low pressure operating conditions is provided according to the present application as shown in FIG. 1, which includes: a valve cover 1, a valve body 2 and an upper diaphragm 3. The upper diaphragm 3 is laid between the valve cover 1 and the valve body 2. The valve cover 1, the valve body 2 and the upper diaphragm 3 are tightly connected through threaded fasteners (such as bolts and screws). A first pressure chamber 11 is defined on a lower surface of the valve cover 1 to accommodate a reverse-flow medium, and a downward pressure is applied to the upper diaphragm 3 by the accommodated reverse-flow medium.

Figure 2:
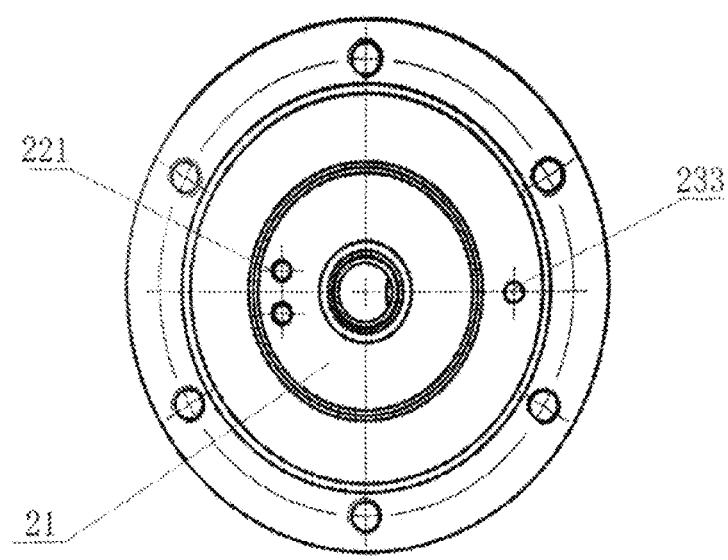
FIG. 2 is a top view of a valve body according to a preferred embodiment of the present application.
Figure 3:
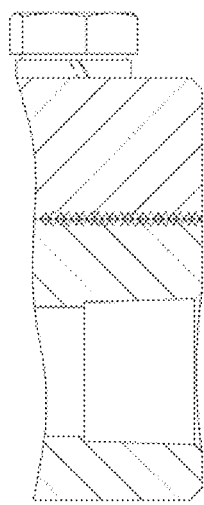
FIG. 3 is a schematic cross-sectional view of a part of a check valve for low pressure operating conditions, showing the serrated concentric finish of the valve cover and the valve body.

An inflow passage 22 and an outflow passage are defined inside the valve body 2, a second pressure chamber 21 is defined on an upper surface of the valve body 2, an inflow hole 221 is defined to extend from an inner wall of the inflow passage 22 to the bottom of the second pressure chamber 21, and the medium enters the second pressure chamber 21 from the inflow passage 22 and through the inflow hole 221, applying an upward pressure on the upper diaphragm 3, so that the upper diaphragm 3 is moved toward the valve cover 1, as shown in FIG. 1 and FIG. 2.

The outflow passage includes a vertical outflow passage 231 and a horizontal outflow passage 232, where an inlet end of the vertical outflow passage 231 is located on the upper surface of the valve body 2, an outlet end of the vertical outflow passage 231 is in communication with the horizontal outflow passage 232, the second pressure chamber 21 and the inlet end of the vertical outflow passage 231 fall within a cover range of the first pressure chamber 11, and when the upper diaphragm 3 moves toward the valve cover 1, the inflow hole 221 is in communication with the vertical outflow passage 231, and the medium flows through the vertical outflow passage 231 and the horizontal outflow passage 232 and then out of the check valve.

A reverse-flow groove 233 communicated to the first pressure chamber 11 is defined on a side wall of the horizontal outflow passage 232. A part of the reverse-flow medium entering the horizontal outflow passage 232 enters the first pressure chamber 11 through the reverse-flow groove 233, and another part of the reverse-flow medium enters the vertical outflow passage 231, so that a reverse sealing is realized by a pressure difference between the upper surface and the lower surface of the upper diaphragm 3.

While the check valve is working, the medium enters from the left side in FIG. 1, then enters the second pressure chamber 21 of the valve body 2 through the inflow passage 22, and acts on the lower surface of the upper diaphragm 3, so that the upper diaphragm 3 is moved toward the valve cover 1, the inflow passage is in communication with the outflow passage, and the medium flows out from the outflow passage.

When the medium enters from the right side of the check valve in FIG. 1, it flows in two paths. In one path, the medium enters the first pressure chamber 11 through the reverse-flow groove 233, and forms a pressure acting on the upper surface of the upper diaphragm 3, thus forming a downward force. In the other path, the medium forms another pressure acting on the lower surface of the upper diaphragm 3 at the upper diaphragm 3 and the vertical outflow passage 231, thus forming an upward force. Since a contact area of the pressure acting on the upper surface of the upper diaphragm 3 is larger than a contact area of the pressure acting on the lower surface of the upper diaphragm 3, the downward force acting on the upper diaphragm 3 is larger than the upward force, so that the upper diaphragm 3 acts as a main seal, and blocks the flow of the medium from the outflow passage to the inflow passage, thus preventing the reverse leakage of the medium.

In a preferred embodiment of the present application, the valve cover 1 and the valve body 2 are sealed by means of serrated concentric finish.

In a preferred embodiment of the present application, the upper diaphragm 3 may be made of polytetrafluoroethylene, fluorinated ethylene propylene copolymer (FEP), canvas-inserted fluororubber and metal.

In a preferred embodiment of the present application, a height of the first pressure chamber 11 is within a maximum elastic deformation range of the upper diaphragm 3 in a same direction, so as to prevent plastic deformation of the upper diaphragm 3 from hindering the high frequency use of the upper diaphragm 3.

Furthermore, an area of a cross section of the first pressure chamber 11 should be as large as possible while satisfying the structural stability of the check valve, so that the downward force on the upper diaphragm 3 will be further larger than the upward force, which is beneficial to preventing leakage.

In a preferred embodiment of the present application, the inflow hole 221 is an inclined flow passage, where the inflow hole 221 has an upstream inlet on the inner wall of the inflow passage 22 and a downstream outlet on the bottom of the second pressure chamber 21, so that the medium can smoothly enter the inflow hole 221 from the upstream inlet after entering the inflow passage 22, which reduces the fluid fluctuation and the sharp pressure increase caused by the shrinkage of the medium hole passage in the inflow passage 22.

In a preferred embodiment of the present application, the second pressure chamber 21 is an annular chamber and is located on an outer circumference of the vertical outflow passage 231. Due to the annular design of the second pressure chamber, the medium exerts force on an annular region of the upper diaphragm, so that the upper diaphragm is more uniformly stressed, prolonging the service life of the upper diaphragm.

In a preferred embodiment of the present application, the vertical outflow passage 231 is located at an axis of the valve body 2. Furthermore, an area of a cross section of the vertical outflow passage 231 should be as small as possible while satisfying the flow rate requirements, so that the downward force on the upper diaphragm 3 will also be further larger than the upward force, which is beneficial to preventing leakage.

In a preferred embodiment of the present application, a lower diaphragm 4 is provided in the second pressure chamber 21, and a thickness of the lower diaphragm 4 is smaller than a height of the second pressure chamber 21. Furthermore, the thickness of the lower diaphragm 4 ranges from ¼ to ¾ of the height of the second pressure chamber 21. The lower diaphragm is arranged below the upper diaphragm, supporting the upper diaphragm during sealing and depressing the deformation of the upper diaphragm. Therefore, the sealing can still be realized even with a smaller deformation caused by a smaller pressure difference between the upper and lower surfaces of the upper diaphragm.

In a preferred embodiment of the present application, an elastic cylindrical pin 5 is mounted in the reverse-flow groove 233, and an upper end of the elastic cylindrical pin 5 is located in the first pressure chamber 11.

Furthermore, an outer wall of the elastic cylindrical pin 5 abuts against an inner wall of the first pressure chamber 11, so the elastic cylindrical pin 5 plays a role of positioning the reverse-flow groove 233.

The above technical solution of the present application realizes good sealing performance of the check valve in the low pressure range, so that the low pressure medium can only flow in one direction in the valve, which solves the problem that the conventional check valve is difficult to open and easy to leak under low pressure.

The present application has been described in detail above in combination with specific embodiments and exemplary examples, but these descriptions should not be construed as limiting the present application. Those skilled in the art should understand that, without departing from the spirit and scope of the present application, various equivalent substitutions, modifications or improvements can be made to the technical solution of the present application and its embodiments, all of which fall within the scope of the present application. The scope of protection of the present application should be delimited by the appended claims.

Contents not described in detail in the specification of the present application are deemed as well known to those skilled in the art.

The invention claimed is:

1. A check valve for low pressure operating conditions, comprising a valve cover, a valve body and an upper diaphragm, wherein the upper diaphragm is laid between the valve cover and the valve body, wherein the valve cover, the valve body and the upper diaphragm are tightly connected through threaded fasteners;
   a first pressure chamber is defined on a lower surface of the valve cover to accommodate a reverse-flow medium;
   an inflow passage and an outflow passage are defined inside the valve body, a second pressure chamber is defined on an upper surface of the valve body, an inflow hole is defined to extend from an inner wall of the inflow passage to the bottom of the second pressure chamber, and the medium enters the second pressure chamber from the inflow passage and through the inflow hole, applying an upward pressure on the upper diaphragm, so that the upper diaphragm is moved toward the valve cover;
   the outflow passage comprises a vertical outflow passage and a horizontal outflow passage, wherein an inlet end of the vertical outflow passage is located on the upper surface of the valve body, an outlet end of the vertical outflow passage is in communication with the horizontal outflow passage, the second pressure chamber and the inlet end of the vertical outflow passage fall within a cover range of the first pressure chamber, and when the upper diaphragm moves toward the valve cover, the inflow hole is in communication with the vertical outflow passage, and the medium flows through the vertical outflow passage and the horizontal outflow passage and then out of the check valve; and
   a reverse-flow groove communicated to the first pressure chamber is defined on a side wall of the horizontal outflow passage, wherein a part of the reverse-flow medium entering the horizontal outflow passage enters the first pressure chamber through the reverse-flow groove, and another part of the reverse-flow medium enters the vertical outflow passage, wherein a contact area between the medium and an upper surface of the upper diaphragm is larger than a contact area between the medium and a lower surface of the upper diaphragm, so that a reverse sealing is realized by a pressure difference between the upper surface and the lower surface of the upper diaphragm, wherein a lower diaphragm is provided in the second pressure chamber, and a thickness of the lower diaphragm is smaller than a height of the second pressure chamber.

2. The check valve according to claim 1, wherein the valve cover and the valve body are sealed by means of serrated concentric finish.

3. The check valve according to claim 1, wherein the upper diaphragm is made of polytetrafluoroethylene, fluorinated ethylene propylene copolymer (FEP), canvas-inserted fluororubber or metal.

4. The check valve according to claim 1, wherein a height of the first pressure chamber is within a maximum elastic deformation range of the upper diaphragm in a same direction.

5. The check valve according to claim 1, wherein the inflow hole is an inclined flow passage, wherein the inflow hole has an upstream inlet on the inner wall of the inflow passage and a downstream outlet on the bottom of the second pressure chamber.

6. The check valve according to claim 1, wherein the vertical outflow passage is located at an axis of the valve body.

7. The check valve according to claim 1, wherein the second pressure chamber is an annular chamber and is located on an outer circumference of the vertical outflow passage.

8. The check valve according to claim 1, wherein an elastic cylindrical pin is mounted in the reverse-flow groove, and an upper end of the elastic cylindrical pin is located in the first pressure chamber.

9. The check valve according to claim 8, wherein an outer wall of the elastic cylindrical pin abuts against an inner wall of the first pressure chamber.

10. The check valve according to claim 1, wherein the thickness of the lower diaphragm ranges from $1/4$ to $3/4$ of the height of the second pressure chamber.

* * * * *